March 24, 1953      E. CLERK      2,632,535
JOINT BETWEEN METAL MEMBERS
Filed Oct. 13, 1948
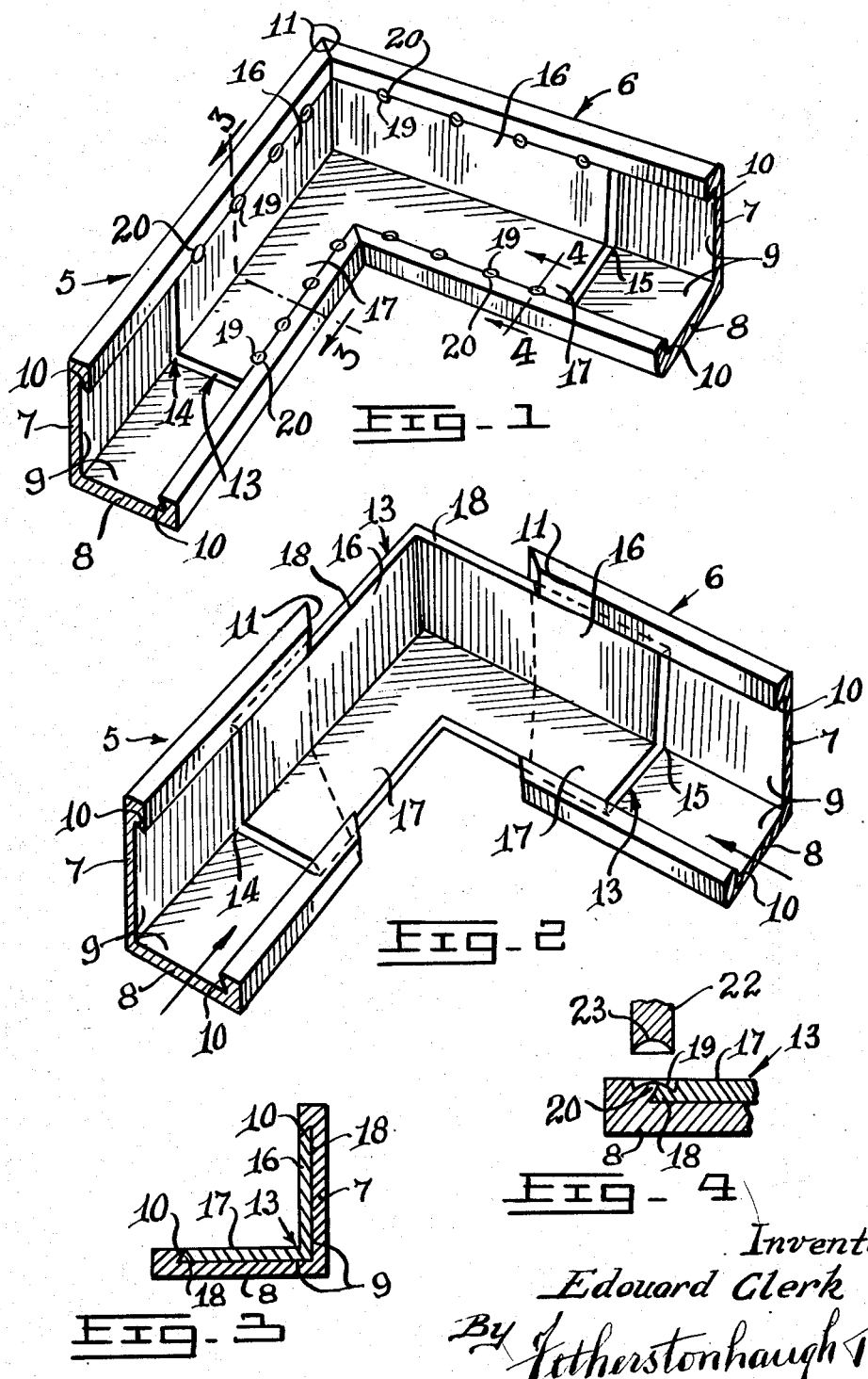
Inventor
Edouard Clerk
By Fetherstonhaugh & Co.
Attorneys Patented Mar. 24, 1953

2,632,535

UNITED STATES PATENT OFFICE 2,632,535

JOINT BETWEEN METAL MEMBERS

Edouard Clerk, St. Hilaire, Quebec, Canada

Application October 13, 1948, Serial No. 54,312

1 Claim. (Cl. 189—36)

This invention relates to the art of joining metal members and the object is to provide a method and means whereby such members may be securely and expeditiously joined together without resorting to welding or brazing or to the use of extraneous fastening means such as rivets, bolts or the like.

A preferred embodiment of the invention is shown in the accompanying drawings in which, Figure 1 is a perspective view showing two metal members arranged at right angles to each other and joined together in accordance with the invention.

Figure 2 is a view similar to Figure 1 but showing the manner in which the metal members are slidably assembled with a connecting member by means of which the metal members are joined together.

Figure 3 is a sectional view taken substantially along the line 3—3 of Figure 1.

Figure 4 is a fragmentary sectional view taken substantially along the line 4—4 of Figure 1.

In these drawings the metal members to be joined together are respectively indicated at 5 and 6. Each member is shown as comprising an angle member of L-shaped cross section presenting flanges 7 and 8 disposed at right angles to each other.

The inner faces of the flanges 7 and 8 are shaped to conjointly provide an L-shaped groove 9 having undercut side walls 10. The members 7 and 8 are provided with mitred ends 11 which are butted together as shown in Figure 1 so that the groove 9 of one member constitutes a right angular continuation of the groove 9 of the companion member. The members 5 and 6 are secured together in the right angular relation shown in Figure 1 by means of an angular connecting member 13 which is slidably fitted in grooves 9, as shown in Figure 2, during the butting together of the mitred ends 11 of members 5 and 6. The connecting member 13 is made in one piece and comprises two leg members 14 and 15 extending at right angles to each other. Each of the leg members 14 and 15 is formed by a pair of right angularly related flanges 16 and 17. The flanges 16 and 17 of leg member 14 are slidably fitted in the groove 9 of metal member 5 while the flanges 16 and 17 of the leg 15 are slidably fitted in the groove 9 of metal member 6. The flanges 16 and 17 of each leg of connecting member 13 are bevelled to fit beneath and in contact with the undercut side walls 10 of the groove 9.

After the metal members 5 and 6 have been assembled with the connecting member 13, as shown in Figure 1, the three members are secured together by distorting the marginal edges of the flanges 16 and 17 of the connecting member 13 and the engaging portions of the undercut side walls 10 of the grooves 9. In this connection it will be noted that at various points along the length of the outer side edges of the flanges 16 and 17 of connecting member 13 the metal of these flanges is distorted as indicated at 19 into binding engagement with similarly distorted opposing portions 20 of the engaging undercut side walls 10 of the grooves 9. This distortion is accomplished by means of a punch 22 having a concave lower end 23 which is forced against the outer edges of the flanges 16 and 17 of connecting member 13 and against the engaging side walls 10 of groove 9 at various points along the length of the connecting member to force portions 19 of the connecting member flanges into binding contact with portions 20 of the groove walls 10 to thereby secure the members 5, 6 and 13 against relative sliding movement.

It will be understood that this invention may be employed for joining together metal members 5 and 6 of various shapes and that the shape of these members and the shape of the connecting member 13, as shown in the present drawings, is merely illustrative of one embodiment of the invention. In this connection, it will also be understood that the members 5 and 6, instead of being L-shaped in cross section, may consist simply of flat bars or strips having corresponding faces shaped to provide a groove corresponding to the groove 9 and having undercut side walls. In this case, the connecting member 13 will consist of a flat strip of metal having its side edges lying in the same plane and bevelled to fit beneath the undercut side walls of the grooves provided in the members to be connected. It will also be understood that the invention may be employed for joining together members 5 and 6 which, while arranged at right angles to each other, are not L-shaped in cross section as shown in the present drawings but have their side edges lying above and below each other in a common vertical plane. In this connection, connecting member 13 will consist of a single flat strip of a width equal to the width of the groove with the side edges of the strip lying one upon the other in a common vertical plane, the connecting strip being bent centrally of its ends to provide two right angularly disposed legs adapted to be inserted in the grooves of the right angularly related members to be connected thereby.

What I claim is:

A metal joint construction comprising a pair of metal members substantially L-shaped in cross section presenting flanges disposed at right angles to each other, the inner faces of the flanges being recessed longitudinally to provide a longitudinal groove L-shaped in cross section and having undercut side walls, said members being positioned at right angles to each other and butted together in end to end relation and a connecting member slidably fitted in the grooves of said metal members in contact with the side walls of said grooves, said connecting member being of a thickness equal to the depth of the grooves and presenting two leg members extending at right angles to each other, each of said leg members being formed by a pair of right angularly related flanges fiitted in the groove of one of said metal members, marginal portions of the flanges of the connecting member and opposing marginal portions of the side walls of said groove being distorted into jamming engagement with each other to secure said members against relative sliding movement in the longitudinal direction of the grooves.

EDOUARD CLERK.

REFERENCES CITED

The following references are of record in the file of this patent:

UNITED STATES PATENTS

| Number | Name | Date |
|---|---|---|
| 299,381 | Grove | May 27, 1884 |
| 1,996,109 | Hiering | Apr. 2, 1935 |
| 2,095,885 | Moreria et al. | Oct. 12, 1937 |
| 2,114,617 | Verhagen | Apr. 19, 1938 |
| 2,188,209 | Sharp | Jan. 23, 1940 |
| 2,451,076 | Edwards, Jr. | Oct. 12, 1948 |
| 2,504,700 | Krantz | Apr. 18, 1950 |